(12) United States Patent
Sharma et al.

(10) Patent No.: US 9,026,075 B2
(45) Date of Patent: May 5, 2015

(54) SESSION ANCHOR TIMESTAMP FOR INTERIM ACCOUNTING REQUESTS

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 110 days.

(21) Appl. No.: 13/840,141

(22) Filed: Mar. 15, 2013

(65) Prior Publication Data

US 2014/0273932 A1 Sep. 18, 2014

(51) Int. Cl.
*H04M 11/00* (2006.01)
*H04M 15/00* (2006.01)
*H04W 4/24* (2009.01)

(52) U.S. Cl.
CPC ............... *H04M 15/65* (2013.01); *H04W 4/24* (2013.01); *H04M 15/41* (2013.01); *H04M 15/43* (2013.01); *H04M 15/8228* (2013.01)

(58) Field of Classification Search
CPC ....... H04W 4/005; H04W 4/008; H04W 4/02; H04W 4/12; H04W 4/20; H04W 4/24; H04W 8/005
USPC .............. 455/405, 406, 407, 411, 414.1, 417, 455/445, 461, 556.1, 556.2, 557
See application file for complete search history.

(56) References Cited

U.S. PATENT DOCUMENTS

| 7,424,102 | B2 * | 9/2008 | Koskinen et al. | 379/114.22 |
| 7,471,634 | B1 * | 12/2008 | Wenzel et al. | 370/241 |
| 2008/0147524 | A1 * | 6/2008 | Connelly | 705/30 |
| 2010/0257077 | A1 | 10/2010 | Cai et al. | |
| 2011/0275345 | A1 * | 11/2011 | Cai et al. | 455/406 |

OTHER PUBLICATIONS

3GPP TS 32.251 V1.0.0 (Sep. 2003), 3rd Generation Partnership Project; Technical Specification Group Services and System Aspects; Telecommunication management; Charging management; Packet Switched (PS) domain charging (Release 6)650 Route des Lucioles—Sophia Antipolis Valbonne—France.

* cited by examiner

*Primary Examiner* — Jean Gelin
(74) *Attorney, Agent, or Firm* — Duft, Bornsen & Fettig, LLP

(57) ABSTRACT

Systems and methods that handle failover between peer charging functions for offline charging. In one embodiment, a Charging Trigger Function (CTF) of a network element detects an interim chargeable event during a session, and generates an interim accounting request for the session responsive to the interim chargeable event. The CTF inserts a session anchor timestamp in the interim accounting request indicating the start time for the session, and transmits the interim accounting request to a charging function. The charging function then monitors a time limit trigger for closing a Charging Data Record (CDR) for the session based on the session anchor timestamp.

20 Claims, 6 Drawing Sheets

US 9,026,075 B2

SESSION ANCHOR TIMESTAMP FOR INTERIM ACCOUNTING REQUESTS

FIELD OF THE INVENTION

The invention is related to the field of communication systems and, in particular, to offline charging for sessions of a communication system.

BACKGROUND

Service providers are able to provide numerous voice and data services to end users (also referred to as subscribers, user equipment, wireless devices, etc.). Examples of voice services are voice calls, call forwarding, call waiting, etc. Examples of data services are streaming audio, streaming video, Voice over Internet Protocol (VoIP), online gaming, IP-TV, etc. The data services are managed by a Packet-Switched (PS) core network, which interfaces the end user with one or more external Packet Data Networks (PDN), such as the Internet. When accessing data services, the sessions established by end users are typically much longer than traditional voice calls. For instance, a typical voice call may last ten minutes or less, while data sessions for surfing the Internet, watching IP-TV, playing online games, etc., may last for many hours or even days.

End users that are served by a PS core network may subscribe to offline charging. Offline charging refers to a charging method where charging information for network resource usage is collected concurrently with the resource usage. To implement offline charging, a Charging Trigger Function (CTF) is embedded in the network elements that serve a session. The CTF collects information on the usage of network resources by an end user for the session. The CTF then determines the occurrence of a chargeable event, and generates charging events based on the network resource usage. The CTF then reports the charging events to an Offline Charging System (OFCS) by sending accounting requests to the OFCS. One example of an accounting request is a Diameter Rf Accounting Request (ACR).

The OFCS includes one or more charging functions, such as Charging Data Functions (CDF), that build Charging Data Records (CDR) based on the charging information provided by the CTFs in the accounting requests. For example, when a network element first becomes involved in a session, the CTF in the network element generates an ACR[Start] and transmits the ACR[Start] to a CDF. After the session is established, the CTF periodically transmits one or more ACR[Interim] messages to the CDF. If the CTF detects that the session ends, then the CTF generates an ACR[Stop] and transmits the ACR[Stop] to the CDF.

When the CDF first receives the ACR[Start] from the CTF, the CDF opens a CDR for the session for that network element. The CDF then updates the open CDR when it receives an ACR[Interim] from the CTF based on the charging information in the ACR[Interim]. If the CDF receives an ACR[Stop] from the CTF, then the CDF closes the CDR for the session for that network element.

The CDF may also close a CDR for the session while the session is still active, which will result in a partial CDR. Such partial CDRs are created to capture changes in the session characteristics, such as inclusion of a new participant in an ad-hoc conference call, a change in QoS by a new offer-answer exchange involving a Service Data Point (SDP), a change in the CODEC being used for the session, etc. Assume, for example, that a CDF receives an ACR[Start] for a session from a CTF. The CDF instantiates a CDR, and initiates a time counter from a start timestamp indicated in the ACR[Start]. If the time counter exceeds the time limit trigger before an ACR[Stop] is received from the CTF, then the CDF can close the (partial) CDR while the session is still active. This CDR is marked as a partial CDR, with the reason for CDR closure noted as "time limit reached". The CDF then opens a new CDR for the session. The charging function will continue to generate partial CDRs upon expiry of the time limit until an ACR[Stop] is received from the CTF for the session. Such parceling of partial session CDRs is considered very useful in sessions that last for hours or even days, since a timely production of the CDR allows an operator to realize revenue in an active billing cycle, rather than waiting for the session to terminate on its own, which may straddle a monthly billing cycle and thereby delay revenue recognition by a month or more.

If the CDF happens to encounter a failure and becomes unavailable to the CTF, then charging will fail over to a peer charging function (e.g., another CDF) in the OFCS. After failover, the CTF will begin sending accounting requests to a secondary charging function in the OFCS. However, when charging fails over to a secondary charging function, the secondary charging function may be out of sync with other charging functions that are also generating partial CDRs for the session (e.g., for other network elements that are serving the session). When charging functions close partial CDRs are different times, correlation of the CDRs subsequent to an aggregation of partial CDRs becomes impossible, as the timers get skewed to a larger extent than the tolerance band for correlation execution. This results in uncorrelated CDRs, which are often discarded by a billing mediation system, as they carry insufficient information.

SUMMARY

Embodiments described herein insert a session anchor timestamp into interim accounting requests so that each of the charging functions used for a session will be in sync when closing CDRs during the session (i.e., generating partial CDRs) due to expiry of a time limit. Previously, a CTF in a network element would insert an event timestamp into an interim accounting request. The event timestamp indicated the start time of the chargeable event that triggered the interim accounting request. In the embodiments described herein, the CTF in a network element will also insert a session anchor timestamp in interim accounting requests that indicates the start time for the session. Each charging function (e.g., CDF) that receives an interim accounting request from the CTF will be able to identify the start time for the session. Even if charging fails over from a primary charging function to a secondary charging function, the secondary charging function will have a start time for the session. Charging functions that open a CDR for the session can monitor a time limit trigger for closing the CDRs based on the start time for the session. Therefore, partial CDRs will be generated at the same time and can be correlated more effectively in the OFCS.

One embodiment comprises a network element of a communication network that serves User Equipment (UE). The network element includes a Charging Trigger Function (CTF) configured to identify an initial chargeable event responsive to a start of a session, to generate an initial accounting request for the session responsive to the initial chargeable event, to insert a start timestamp in the initial accounting request indicating a start time for the session, and to transmit the initial accounting request to a first charging function to initiate session-based offline charging for the session. The CTF is further configured to identify a failure involving the first charging function. The CTF is further configured to detect an interim chargeable event during the session, to generate an interim accounting request for the session responsive to the interim chargeable event, to insert a session anchor timestamp in the interim accounting request indicating the start time for the session, and to transmit the interim accounting request to a second charging function (instead of the first charging function due to the failure).

In another embodiment, the CTF is configured to insert an event timestamp in the interim accounting request indicating a start time for the interim chargeable event.

In another embodiment, the interim accounting request comprises a Diameter Rf Accounting Request (ACR)[Interim], and a new Attribute Value Pair (AVP) is defined for the session anchor timestamp in the ACR[Interim].

In another embodiment, the AVP for the session anchor timestamp is mandatory for the ACR[Interim].

In another embodiment, the session anchor timestamp inserted in the interim accounting request indicates the start time for an IP Connectivity Access Network (IP-CAN) bearer for the session, the start time for a service data flow for the IP CAN bearer, or the start time for an IP Multimedia Subsystem (IMS) session.

Another embodiment comprises a method operable in a network element that serves User Equipment (UE). The method includes the steps of identifying an initial chargeable event in the CTF responsive to a start of a session, generating an initial accounting request for the session responsive to the initial chargeable event, inserting a start timestamp in the initial accounting request indicating a start time for the session, and transmitting the initial accounting request to a first charging function to initiate session-based offline charging for the session. The method further includes identifying a failure involving the first charging function. After the failure, the method further includes detecting an interim chargeable event during the session, generating an interim accounting request for the session responsive to the interim chargeable event, inserting a session anchor timestamp in the interim accounting request indicating the start time for the session, and transmitting the interim accounting request to a second charging function.

In another embodiment, the method further includes inserting an event timestamp in the interim accounting request indicating a start time for the interim chargeable event.

Another embodiment comprises a charging function for offline charging. The charging function is configured to receive an interim accounting request for a session from a network element, and to open a Charging Data Record (CDR) for the session based on the interim accounting request, where charging for the session was transferred to the charging function from a peer charging function due to a failure involving the peer charging function. The charging function is configured to parse the interim accounting request to identify a session anchor timestamp indicating a start time for the session, to monitor a time limit trigger for closing the CDR based on the start time for the session as indicated in the session anchor timestamp, and to close the CDR upon expiry of the time limit.

In another embodiment, the charging function is configured to ignore an event timestamp in the interim accounting request when monitoring the time limit trigger, where the event timestamp indicates a start time for an interim chargeable event that triggered the interim accounting request.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
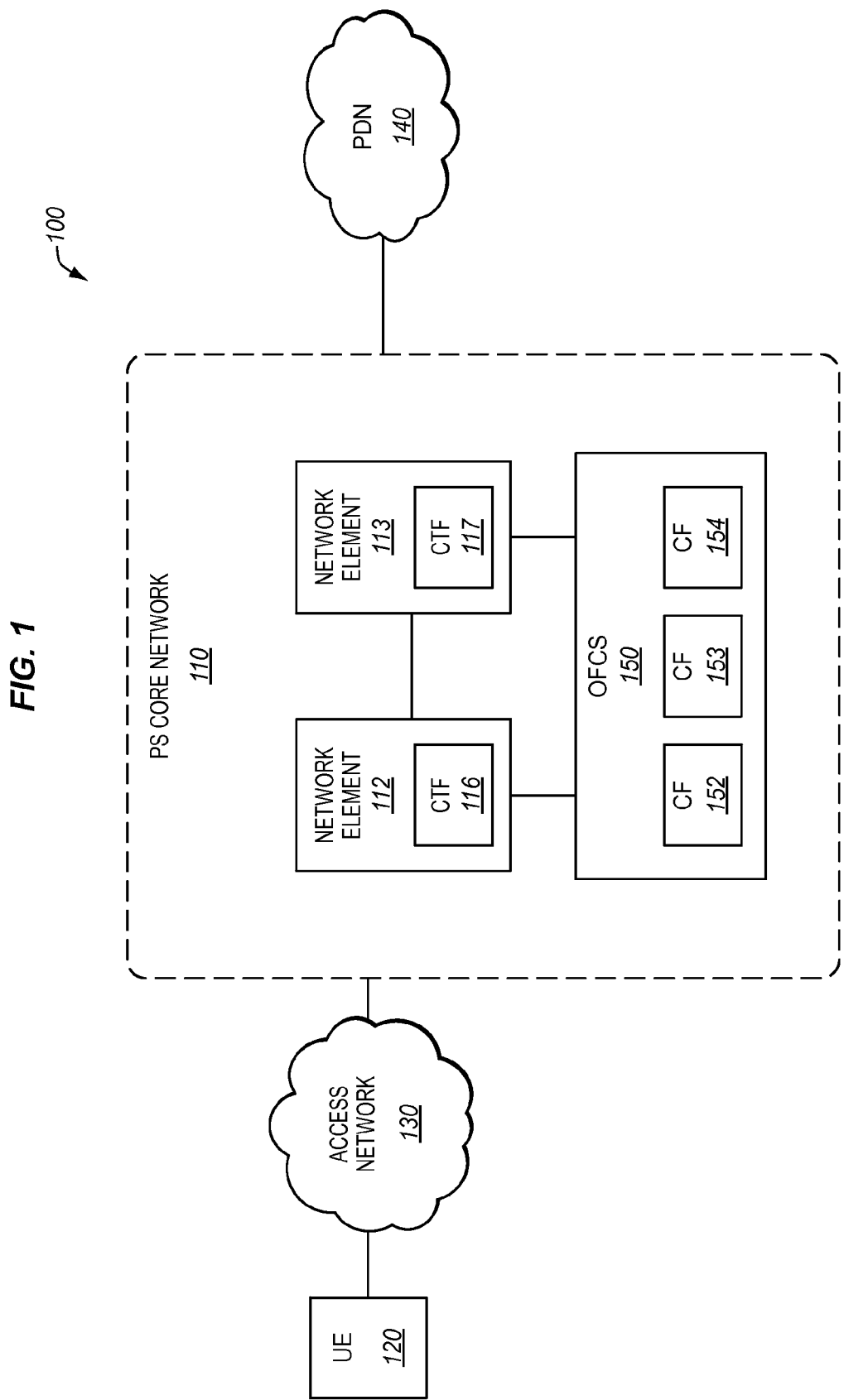
FIG. 1 illustrates a communication network in an exemplary embodiment.

FIG. 1 illustrates a communication network 100 in an exemplary embodiment. Communication network 100 may represent a Long Term Evolution (LTE) network, an IP Multimedia Subsystem (IMS) network, or another type of Third Generation (3G) or Fourth Generation (4G) communication network. Network 100 includes a Packet-Switched (PS) core network 110 that provides various services to end users. One example of PS core network 110 is an Evolved Packet Core (EPC) network. In this embodiment, PS core network 110 includes network elements 112-113 that are each able to provide services. One example of network element 112 may be a Serving Gateway (S-GW) of an EPC network as described in the LTE standards. One example of network element 113 may be a Packet Data Network Gateway (PDN-GW) of an EPC network as described in the LTE standards. PS core network 110 may include many more network elements that are not shown in FIG. 1 for ease of illustration.

PS core network 110 provides data services to User Equipment (UE) 120 of an end user (and other UEs not shown). UE 120 may be a mobile device (e.g., a mobile phone), a computer, a tablet, etc. UE 120 is able to access PS core network 110 through access network 130. Access network 130 comprises any type of network that interfaces UEs with PS core network 110. One example of access network 130 is a Radio Access Network (RAN), such as a UMTS Terrestrial Radio Access Network (UTRAN), an enhanced UTRAN (E-UTRAN), an Interworking-Wireless Local Area Network (I-WLAN), etc. PS core network 110 also connects to one or more external Packet Data Networks (PDN) 140, such as the internet.

Within PS core network 110, network elements 112-113 each include a Charging Trigger Function (CTF) 116-117, respectively. A CTF comprises any entity that generates charging events based on the observation of network resource usage. The CTF is the focal point for collecting information pertaining to chargeable events within a network element, assembling this information into matching charging events, and sending these charging events towards a charging function in the form of accounting requests. A CTF is implemented in each network element or service element that provides charging information. Therefore, CTF 116 is illustrated in FIG. 1 as being embedded in network element 112, and CTF 117 is illustrated in FIG. 1 as being embedded in network element 113.

PS core network 110 also includes an Offline Charging System (OFCS) 150. OFCS 150 comprises any system, server, or function operable to provide offline charging for services/sessions accessed by end users, such as the end user of UE 120. OFCS 150 includes a group of peer charging functions (CF) 152-154 used for offline charging. A charging function 152-154 is configured to receive accounting requests (i.e., charging events) from network elements, and use the charging information contained in the accounting requests to construct Charging Data Records (CDRs). One example of a charging function 152-154 is a Charging Data Function (CDF) as defined by the 3GPP in TS 32.240 (Release 6). The purpose of offline charging is to transform the charging information into CDRs that are post-processed within a Billing Domain (BD) for the purpose of generating bills. A charging function as described herein may be comprised of hardware in one embodiment. In another embodiment, a charging function may include software that is executed by a processing system.

Offline charging can be categorised into two distinct classes: event-based charging and session-based charging. In event-based charging, a chargeable event is defined as a single end-user-to-network transaction, such as sending a multimedia message. The single transaction is mapped to a charging event, which results in a single CDR. In session-based charging, a user session is established resulting in the generation of multiple chargeable/charging events and the generation of one or more CDRs. In session-based charging, at least two charging events are needed. One charging event describes the start of the session, and the other charging event describes the end of the session. Multiple interim charging events are possible to describe changes to session characteristics (i.e., change of charging conditions), when a time limit is reached, when a volume limit is reached, etc.

When a CTF reports a charging event for a session to an OFCS, the CTF will send accounting requests for this session to a primary charging function in the OFCS. Ideally, the primary charging function will receive the accounting requests and build CDRs for the session until the session ends. However, there may be instances when the primary charging function encounters a failure or otherwise becomes unavailable to charge for the session. If the CTF identifies that the primary charging function does not acknowledge receipt of accounting requests (typically after one or more retries), then the CTF will fail over to a secondary charging function. The secondary charging function will then begin building CDRs for the session based on the accounting requests received from the CTF.

A problem may be encountered when charging for a session fails over from one charging function to another peer charging function. When charging is switched during an active session, the secondary charging function does not receive an initial accounting request for the session. Thus, the secondary charging function does not receive timestamps for the session that are typically included in the initial accounting request. Each of charging functions in an OFCS will store CDR generation triggers for closing a CDR. Some triggers for closing a CDR include time limit, volume limit, limit of change of charging conditions, end of session (e.g., reception of a final accounting request), and limits (e.g., memory size) imposed by implementation. When a charging function closes a CDR based on the "time limit" trigger, the charging function will typically use the start time of the session to determine when the time limit is exceeded. For example, if the time limit is six (6) hours, then the charging functions will close a CDR six (6) hours from the start time of the session (which is referred to as expiry of the time limit). If charging for a session is transferred to a secondary charging function during an active session, the secondary charging function will initiate a counter at the time the session is transferred; not the start of the session. Thus, the secondary charging function will close CDRs upon expiry of the time limit trigger at different times than other peer charging functions that also opened CDRs for the session. This can make it difficult to correlate the partial CDRs for the session from the peer charging functions.

Figure 2:
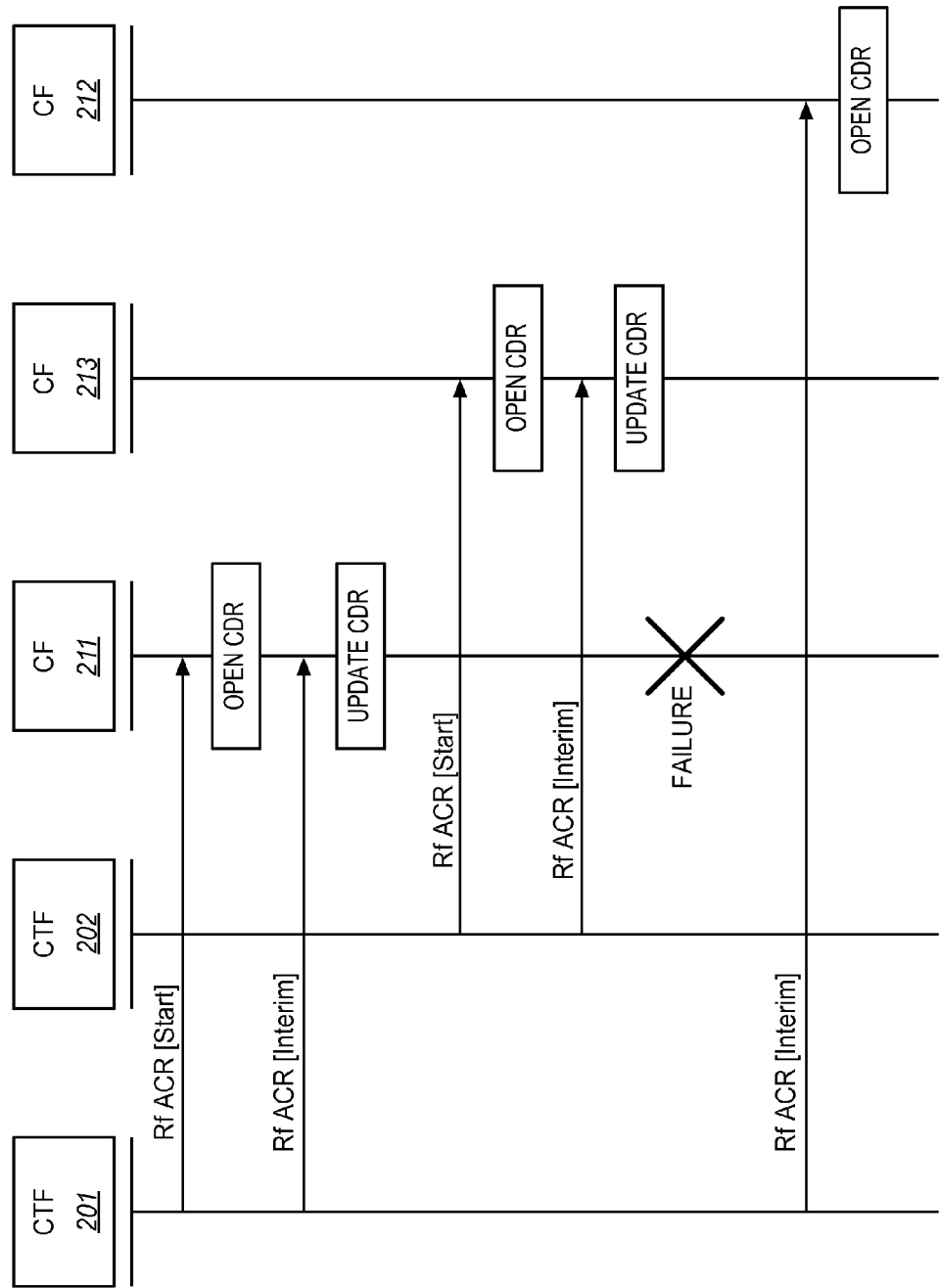
FIG. 2 illustrates offline charging with a failure of a charging function.

FIG. 2 illustrates offline charging with a failure of a charging function. When a CTF 201 starts session reporting, CTF 201 sends an ACR[Start] to charging function (CF) 211. The ACR[Start] includes an Attribute Value Pair (AVP) called "Event-Timestamp", which carries the timestamp of the chargeable event that triggered the ACR[Start]. The chargeable event for the ACR[Start] is the start of the session, so the event timestamp in the ACR[Start] will indicate the start of the session. CF 211 opens a CDR for the session in response to the ACR[Start], and starts a counter to monitor the time limit trigger. Those skilled in the art understand that CF 211 will also respond to CTF 201 with an Accounting Answer, e.g., ACA[Start], which is not shown for the sake of brevity.

After sending the ACR[Start], CTF 201 may also send one or more ACRs[Interim] to CF 211. An ACR[Interim] also includes an AVP called "Event-Timestamp", which carries the timestamp of the chargeable event that triggered the ACR [Interim]. The chargeable event for the ACR[Interim] may be a time limit, a volume limit, change of media for the session, etc. Therefore, the event timestamp in the ACR[Interim] will indicate the start of the chargeable event. CF 211 then updates the CDR for the session based on the charging information contained in the ACR[Interim].

Similarly, CTF 202 also detects the start of the session, and sends an ACR[Start] to CF 213. Both CTF 201 and CTF 202 detect the start of the session and are embedded in network elements that serve the session. CF 213 opens a CDR for the session in response to the ACR[Start], and starts a counter to monitor the time limit trigger. After sending the ACR[Start], CTF 202 may also send one or more ACR[Interim] to CF 213. CF 213 then updates the CDR for the session based on the charging information contained in the ACR[Interim].

At some point during the active session, CF 211 encounters a failure and is no longer available to CTF 201. Therefore, CTF 201 fails over to CF 212, and begins sending ACRs [Interim] to CF 212. CF 212 opens a CDR for the session in response to an ACR[Interim], and starts a counter to monitor the time limit trigger. However, CF 212 will monitor the time limit trigger based on the time it receives the first ACR[Interim], which is the time indicated in the event timestamp of the ACR[Interim]. Therefore, CF 212 will be monitoring the time limit trigger based on the event timestamp of the ACR [Interim], while CF 213 will be monitoring the time limit trigger based on the start of the session. Because these CFs are monitoring the time limit trigger based on different start times, the CFs will close CDRs for the session at different times.

Figure 3:
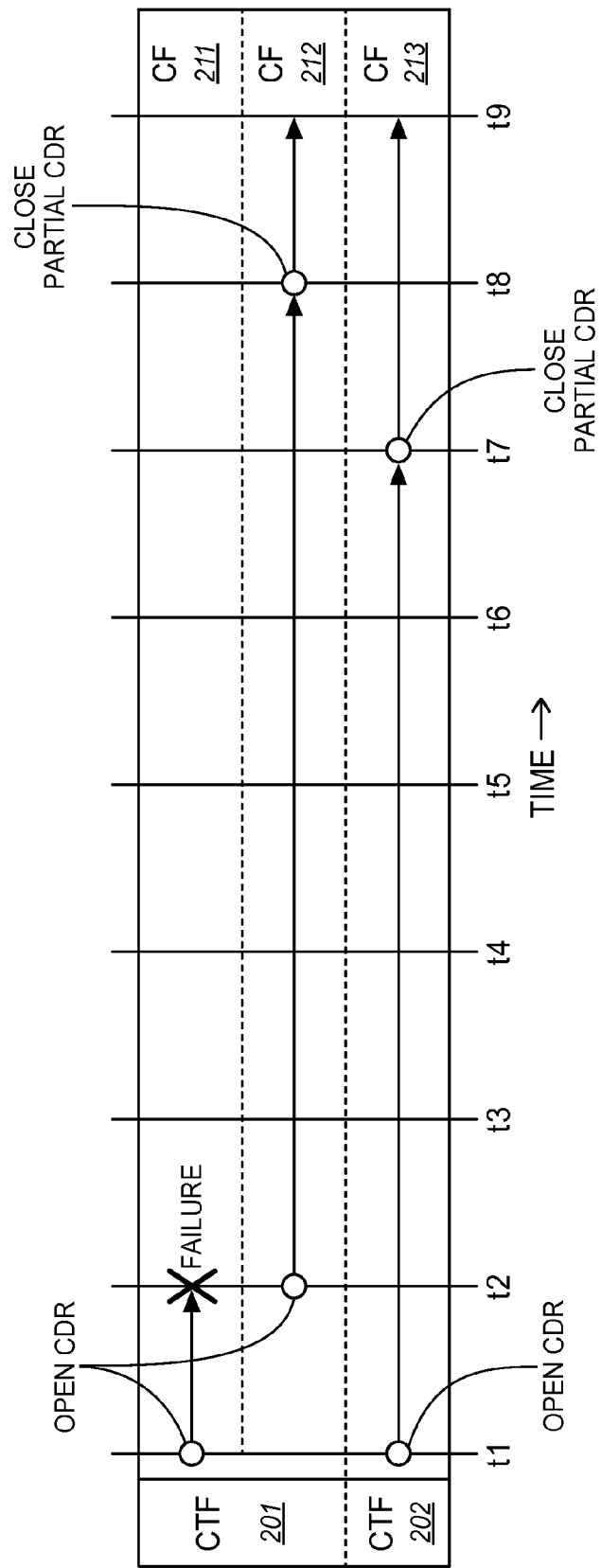
FIG. 3 is a timing diagram illustrating opening and closing times for CDRs based on a time limit trigger.

FIG. 3 is a timing diagram illustrating opening and closing times for CDRs based on a time limit trigger. The session beings at time t1, where CF 211 opens a CDR for the session in response to receiving an ACR[Start] from CTF 201. CF 213 also opens a CDR for the session in response to receiving an ACR[Start] from CTF 202. At time t2, CF 211 encounters a failure, so charging fails over to CF 212. CTF 201 will send an ACR[Interim] to CF 212, and CF 212 will open a CDR for the session at time t2 in response to receiving the ACR[Interim] from CTF 201.

Because CF 213 receives an ACR[Start] for the session, CF 213 monitors the time limit trigger from time t1. If the time limit trigger is six (6) hours, then CF 213 will close the CDR for the session at time t7 (as is shown in FIG. 3) in order to generate a partial CDR. However, CF 212 did not receive an ACR[Start] for the session. Thus, CF 212 monitors the time limit trigger from time t2, which is the time the ACR[Interim] was received from CTF 201. CF 212 will therefore close the CDR at time t8 as shown in FIG. 3 in order to generate a partial CDR. When CFs close partial CDRs at different times like this, it is difficult to correlate the partial CDRs for the session.

In the following embodiments, a session anchor timestamp is inserted in interim accounting requests (e.g., ACR[Interim]) that indicates the start time of the session. If charging fails over to a secondary charging function, the secondary charging function will be able to identify the start time of the session from the session anchor timestamp. Thus, the secondary charging function will be able to monitor the time limit trigger from the same starting point as other charging functions that generate CDRs for the session.

Figure 4:
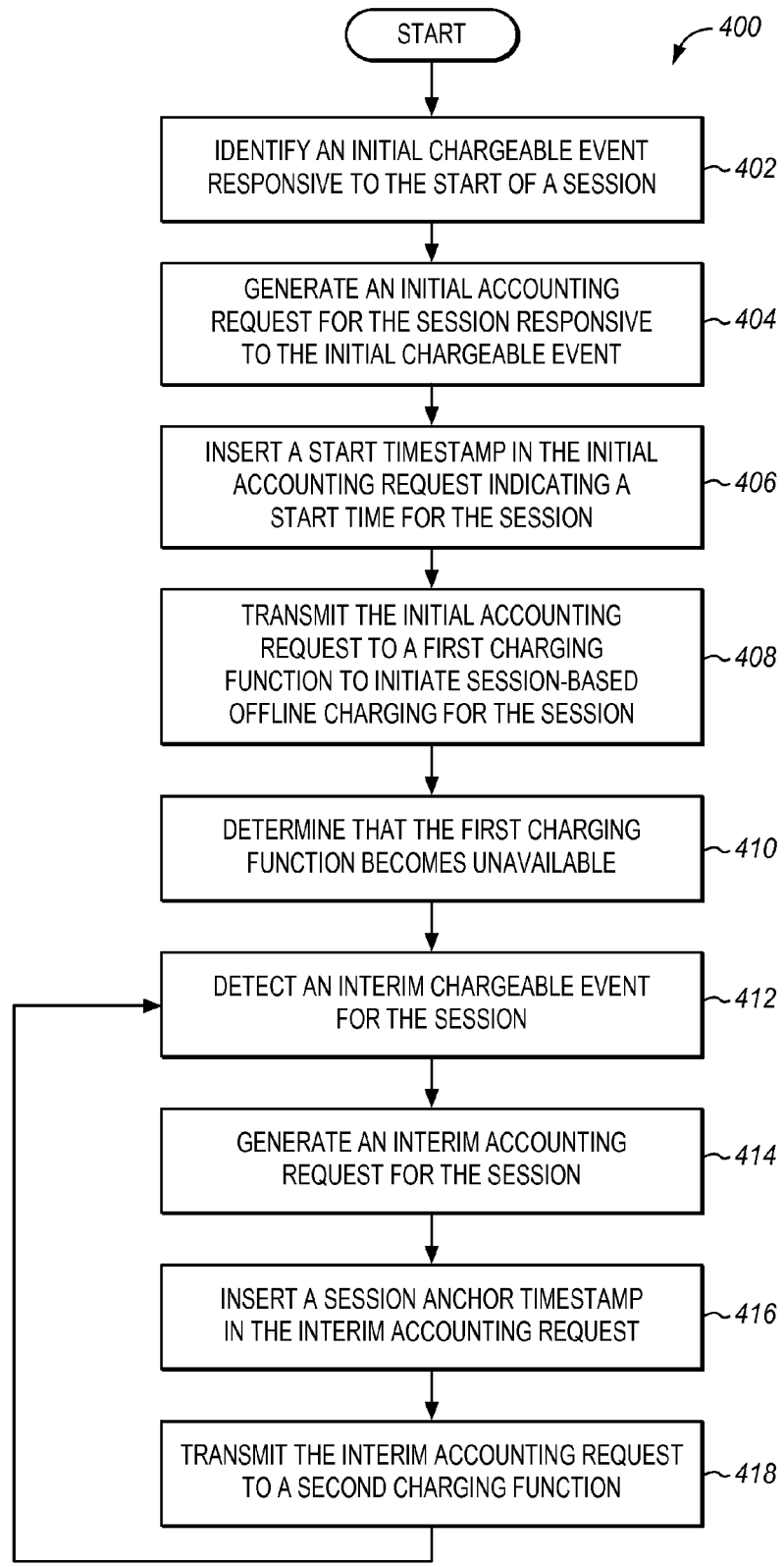
FIG. 4 is a flow chart illustrating a method of performing offline charging in a CTF in an exemplary embodiment.
Figure 5:
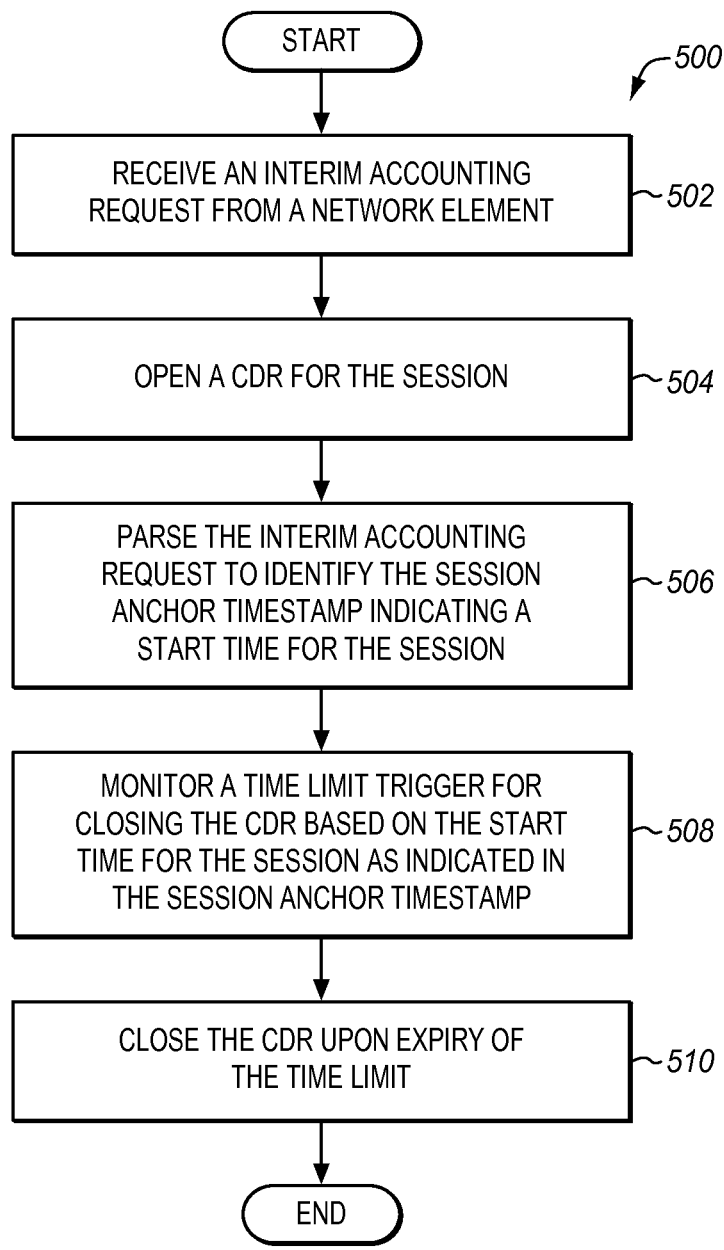
FIG. 5 is a flow chart illustrating a method of performing offline charging in a charging function in an exemplary embodiment.

To illustrate the concept of a session anchor timestamp, assume that UE 120 (see FIG. 1) initiates a session over PS core network 110, and that network element 112 serves the session. The session as described herein may be referred to as an IP Connectivity Access Network (IP-CAN) session. An IP-CAN session is an association between UE 120 represented by an IPv4 address and/or an IPv6 prefix, and PDN 140. An IP-CAN session may incorporate one or more IP-CAN bearers. An IP-CAN bearer is an IP transmission path of defined capacity, delay and bit error rate, etc. Each IP-CAN bearer may be made up of one or more Service Data Flows (SDF), which is a flow of packets. FIGS. 4-5 illustrate how offline charging is performed with the session anchor timestamp.

FIG. 4 is a flow chart illustrating a method 400 of performing offline charging in a CTF in an exemplary embodiment. The steps of method 400 will be described with reference to CTF 116 in FIG. 1, but those skilled in the art will appreciate that method 400 may be performed in other systems. Also, the steps of the flow chart in FIG. 4 are not all inclusive and may include other steps not shown, and further, the steps may be performed in an alternative order.

In step 402, CTF 116 of network element 112 identifies an initial chargeable event responsive to the start of a session. The start of a "session" may refer to the start of an IP-CAN bearer, the start of a service data flow for an IP-CAN bearer, the start of an IMS session, etc. In step 404, CTF 116 generates an initial accounting request for the session responsive to the initial chargeable event. In step 406, CTF 116 inserts a start timestamp in the initial accounting request indicating a start time for the session. In step 408, CTF 116 transmits the initial accounting request to charging function 152 to initiate session-based offline charging for the session. After sending the initial accounting request, CTF 116 may send one or more interim accounting requests to charging function 152 as the session continues (not shown in FIG. 4).

The initial accounting request generated by CTF 116 may comprise a Diameter Rf ACR[Start]. CTF 116 may therefore insert the start timestamp for the session in an "Event-Timestamp" AVP of the ACR[Start]. CTF 116 may then transmit the ACR[Start] to charging function 152 over the Diameter Rf interface.

In response to the initial accounting request, charging function 152 opens a CDR for the session (for CTF 116). Charging function 152 will also update the CDRs for the session based on charging information included in the interim accounting requests.

In this embodiment, there is a failure to charging function 152 after CTF 116 sends the initial accounting request to charging function 152. Therefore, CTF 116 determines that charging function 152 becomes unavailable in step 410 after the initial accounting request was sent to charging function 152. Because charging function 152 is now unavailable, CTF 116 will fail over to charging function 153 for this session. As network element 112 continues to serve the session, CTF 116 detects an interim chargeable event for the session in step 412. In response to the interim chargeable event, CTF 116 generates an interim accounting request for the session in step 414. In step 416, CTF 116 inserts a session anchor timestamp in the interim accounting request. The session anchor timestamp indicates the start time for the session (e.g., IP-CAN bearer, service data flow, IMS session, etc). Thus, the session anchor timestamp should match the start timestamp that was inserted in the initial accounting request. CTF 116 may also insert an event timestamp in the interim accounting request. The event timestamp indicates a start time for the interim chargeable event. Previously, a CTF would only insert an event timestamp in an interim accounting request. However, CTF 116 is enhanced in this embodiment to also insert the session anchor timestamp into the interim accounting request. CTF 116 then transmits the interim accounting request to charging function 153 in step 418, which is a peer charging function to charging function 152.

The interim accounting request generated by CTF 116 may comprise a Diameter Rf ACR[Interim]. In order to support the session anchor timestamp as provided herein, a new AVP is defined in an ACR[Interim] for the session anchor timestamp. The new AVP may be named "Session-Anchor-Timestamp" or something similar. The following illustrates an ACR[Interim] with the new "Session-Anchor-Timestamp" AVP:

```
<ACR> ::= < Diameter Header: 271, REQ, PXY >
          < Session-Id >
          { Origin-Host }
          { Origin-Realm }
          { Destination-Realm }
          { Accounting-Record-Type }
          { Accounting-Record-Number }
          [ Session-Anchor-Timestamp]
          [ Acct-Application-Id ]
          [ Vendor-Specific-Application-Id ]
          [ User-Name ]
          [ Accounting-Sub-Session-Id ]
          [ Acct-Session-Id ]
          [ Acct-Multi-Session-Id ]
          [ Acct-Interim-Interval ]
          [ Accounting-Realtime-Required ]
          [ Origin-State-Id ]
```

```
[ Event-Timestamp ]
* [ Proxy-Info ]
* [ Route-Record ]
* [ AVP ]
```

The Session-Anchor-Timestamp AVP may have the following attributes:
1. AVP categorization—$O_M$—which signifies that the AVP is Operator-mandatory, that is, the support of this AVP is required by the operator.
2. AVP flags:
   M-bit: Per RFC 3588, this bit specifies if support of the AVP is required at the charging function or not. This bit is set to one (1) so that the charging function honors the AVP and does not discard it.
   V-bit: Per RFC 3588, this bit is used for vendor-specific AVPs.
   P-bit: This bit signifies end-to-end encryption and it is set to zero (0), as it is not needed.

Because the interim accounting request includes the session anchor timestamp, charging system 153 will be able to close CDRs at the same time as other peer charging functions that open CDRs for the session. In one embodiment, each interim accounting request after a failover includes an anchor timestamp. In another embodiment, each interim accounting request transmitted at any time includes an anchor timestamp. This embodiment ensures that should a failure of a CF not be communicated back to a CTF and/or not all, accounting requests of a CTF will be communicated/delivered to a same CF (e.g., accounting requests hashed/delivered to one of several CFs in order to handle traffic volumes), and charging system 153 will be able to close CDRs at the same time as other peer charging functions that open CDRs for the session. In another embodiment, the first interim accounting request after a failover includes an anchor timestamp. An exemplary operation of charging system 153 is illustrated in FIG. 5.

FIG. 5 is a flow chart illustrating a method 500 of performing offline charging in a charging function in an exemplary embodiment. The steps of method 500 will be described with reference to charging function 153 in FIG. 1, but those skilled in the art will appreciate that method 500 may be performed in other systems.

In step 502, charging function 153 receives the interim accounting request from CTF 116 of network element 112. In response to the interim accounting request, charging function 153 opens a CDR for the session (for network element 112) in step 504. Charging function 153 also parses the interim accounting request to identify the session anchor timestamp indicating a start time for the session in step 506. Charging function 153 is enhanced in this embodiment to identify the session anchor timestamp from the interim accounting request. Charging function 153 is further enhanced to monitor the time for closing CDRs based on the session anchor timestamp. Therefore, the session anchor timestamp will be used by charging function 153 to determine when a time limit is reached to close a partial CDR, instead of an event timestamp that is also included in the interim accounting request.

After identifying the session anchor timestamp, charging function 153 monitors a time limit trigger for closing the CDR based on the start time for the session as indicated in the session anchor timestamp (step 508). Charging function 153 will therefore monitor the time limit trigger based on the start time for the session instead of based on an event timestamp included in the interim accounting request. Even though the interim accounting request also includes an event timestamp that indicates a start time for an interim chargeable event, charging function 153 will ignore the event timestamp when monitoring the time limit trigger.

While charging function 153 is monitoring the time limit trigger, charging function 153 may receive one or more interim accounting requests for the session from CTF 116. Charging function 153 will update the CDR for the session based on charging information contained in the interim accounting requests. If the time limit expires before charging function 153 receives a final accounting request (e.g., ACR [Stop]), then charging function 153 closes the CDR upon expiry of the time limit in step 510. The CDR is considered a partial CDR at this point, since the CDR was closed while the session is still active.

Figure 6:
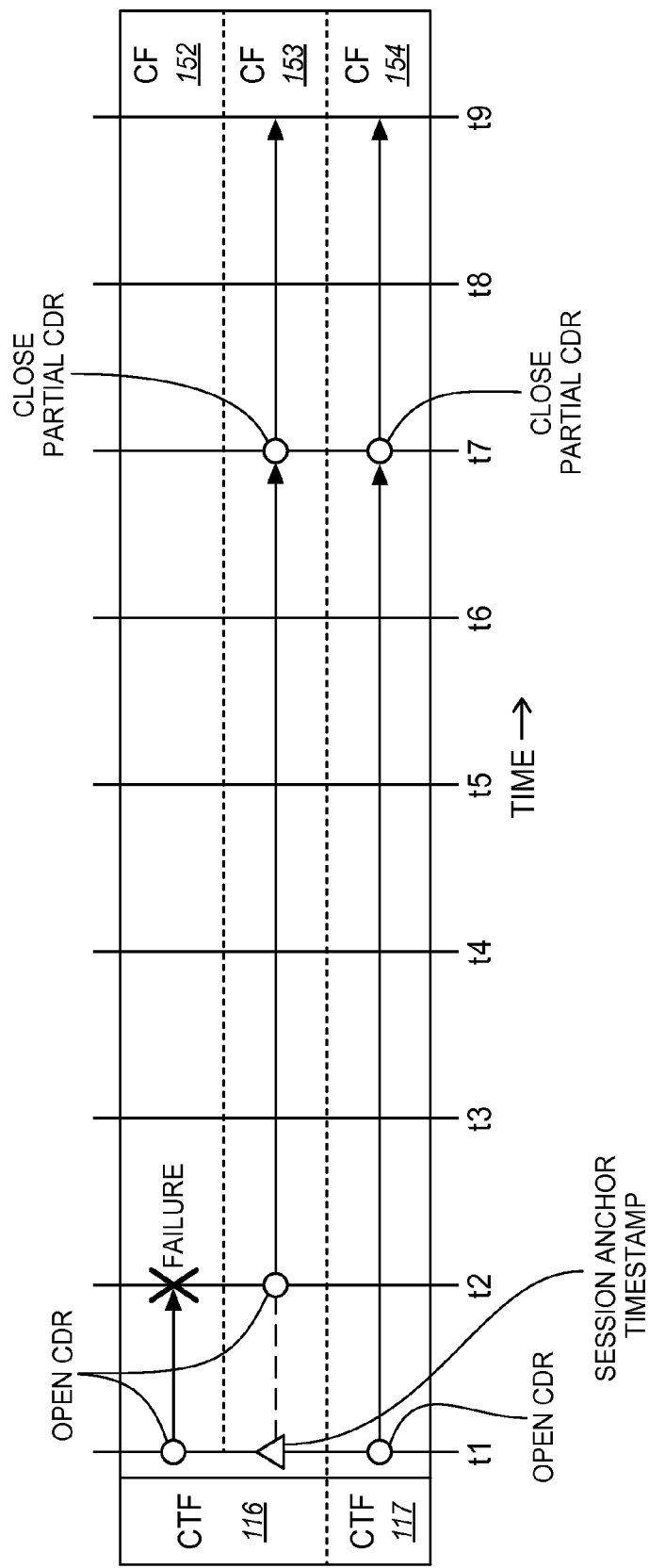
FIG. 6 is a timing diagram illustrating opening and closing times for CDRs based on a time limit trigger in an exemplary embodiment.

Because charging function 153 monitors the time limit trigger based on the start time for the session, charging function 153 will close the CDR for the session at the same time as other peer charging functions close CDRs for the session. FIG. 6 is a timing diagram illustrating opening and closing times for CDRs based on a time limit trigger in an exemplary embodiment. Assume again that the session beings at time t1. Charging function 152 opens a CDR for the session in response to receiving an ACR[Start] from CTF 116. Similarly, charging function 154 opens a CDR for the session in response to receiving an ACR[Start] from CTF 117. At time t2, charging function 152 encounters a failure, so charging fails over to charging function 153. Thus, CTF 116 will send an ACR[Interim] to charging function 153. Charging function 153 then opens a CDR for the session at time t2 in response to the ACR[Interim].

Because charging function 154 receives an ACR[Start] for the session, charging function 154 monitors the "time limit" trigger from time t1. If the time limit trigger is six (6) hours, then charging function 154 will close the CDR for the session at time t7 as shown in FIG. 6.

Charging function 153 does not receive an ACR[Start] for the session. But, the ACR[Interim] sent by CTF 116 includes the session anchor timestamp that indicates the start of the session. Therefore, charging function 153 is able to parse the ACR[Interim] to identify the session anchor timestamp, and to monitor the "time limit" trigger based on the start of the session. Therefore, charging function 153 will monitor the time limit trigger from time t1. Charging function 153 will therefore close the CDR for the session at time t7 as does charging function 154. Thus, charging functions 153-154 are synchronized when they close (partial) CDRs for the session.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:
1. An apparatus comprising:
a network element for a communication network that serves User Equipment (UE);
the network element including a processor comprising a Charging Trigger Function (CTF) configured to identify an initial chargeable event responsive to a start of a session, to generate an initial accounting request for the session responsive to the initial chargeable event, to insert a start timestamp in the initial accounting request indicating a start time for the session, and to transmit the initial accounting request to a first charging function to initiate session-based offline charging for the session;
the CTF configured to identify a failure involving the first charging function, to detect an interim chargeable event during the session, to generate an interim accounting request for the session responsive to the interim chargeable event, to insert a session anchor timestamp in the interim accounting request indicating the start time for the session, and to transmit the interim accounting request to a second charging function.

2. The apparatus of claim 1 wherein:
the CTF is configured to insert an event timestamp in the interim accounting request indicating a start time for the interim chargeable event.

3. The apparatus of claim 1 wherein:
the interim accounting request comprises a Diameter Rf Accounting Request (ACR)[Interim]; and
the Diameter Rf ACR[Interim] includes an Attribute Value Pair (AVP) defining the session anchor timestamp.

4. The apparatus of claim 3 wherein:
the AVP for the session anchor timestamp is mandatory for the Diameter Rf ACR[Interim].

5. The apparatus of claim 1 wherein:
the session anchor timestamp in the interim accounting request indicates the start time for an IP Connectivity Access Network (IP-CAN) bearer for the session.

6. The apparatus of claim 5 wherein:
the session anchor timestamp in the interim accounting request indicates the start time for a service data flow for the IP-CAN bearer.

7. The apparatus of claim 1 wherein:
the session anchor timestamp in the interim accounting request indicates the start time for an IP Multimedia Subsystem (IMS) session.

8. A method operable in a network element that serves User Equipment (UE), the method comprising:
identifying an initial chargeable event responsive to a start of a session;
generating an initial accounting request for the session responsive to the initial chargeable event;
inserting a start timestamp in the initial accounting request indicating a start time for the session;
transmitting the initial accounting request to a first charging function to initiate session-based offline charging for the session;
identifying a failure involving the first charging function;
detecting an interim chargeable event during the session;
generating an interim accounting request for the session responsive to the interim chargeable event;
inserting a session anchor timestamp in the interim accounting request indicating the start time for the session; and
transmitting the interim accounting request to a second charging function.

9. The method of claim 8 further comprising:
inserting an event timestamp in the interim accounting request indicating a start time for the interim chargeable event.

10. The method of claim 8 wherein:
the interim accounting request comprises a Diameter Rf Accounting Request (ACR)[Interim]; and
the Diameter Rf ACR[Interim] includes an Attribute Value Pair (AVP) defining the session anchor timestamp.

11. The method of claim 10 wherein:
the AVP for the session anchor timestamp is mandatory for the Diameter Rf ACR[Interim].

12. The method of claim 8 wherein:
the session anchor timestamp in the interim accounting request indicates the start time for an IP Connectivity Access Network (IP-CAN) bearer for the session.

13. The method of claim 12 wherein:
the session anchor timestamp in the interim accounting request indicates the start time for a service data flow for the IP-CAN bearer.

14. The method of claim 8 wherein:
the session anchor timestamp in the interim accounting request indicates the start time for an IP Multimedia Subsystem (IMS) session.

15. An apparatus comprising:
a charging function for offline charging configured to receive an interim accounting request for a session from a network element, and to open a Charging Data Record (CDR) for the session based on the interim accounting request, wherein charging for the session was transferred to the charging function from a peer charging function due to a failure involving the peer charging function;
wherein the charging function is configured to parse the interim accounting request to identify a session anchor timestamp indicating a start time for the session, to monitor a time limit trigger for closing the CDR based on the start time for the session as indicated in the session anchor timestamp, and to close the CDR upon expiry of the time limit.

16. The apparatus of claim 15 wherein:
the charging function is configured to ignore an event timestamp in the interim accounting request when monitoring the time limit trigger, wherein the event timestamp indicates a start time for an interim chargeable event that triggered the interim accounting request.

17. The apparatus of claim 15 wherein:
the interim accounting request comprises a Diameter Rf Accounting Request (ACR)[Interim]; and
the charging function is configured to parse a new Attribute Value Pair (AVP) in the Diameter Rf ACR[Interim] to identify the session anchor timestamp.

18. The apparatus of claim 15 wherein:
the session anchor timestamp in the interim accounting request indicates the start time for an IP Connectivity Access Network (IP-CAN) bearer for the session.

19. The apparatus of claim 18 wherein:
the session anchor timestamp in the interim accounting request indicates the start time for a service data flow for the IP-CAN bearer.

20. The apparatus of claim 15 wherein:
the session anchor timestamp in the interim accounting request indicates the start time for an IP Multimedia Subsystem (IMS) session.

* * * * *